April 13, 1965 P. G. PEROTTO 3,178,687

CHARACTER RECOGNITION APPARATUS

Filed May 15, 1962 6 Sheets-Sheet 1

INVENTOR.
PIER GIORGIO PEROTTO
BY Kenyon & Kenyon
ATTORNEYS

CHARACTER RECOGNITION APPARATUS

Filed May 15, 1962

6 Sheets-Sheet 2

INVENTOR.
PIER GIORGIO PEROTTO
BY
Kenyon & Kenyon
ATTORNEYS

April 13, 1965 P. G. PEROTTO 3,178,687

CHARACTER RECOGNITION APPARATUS

Filed May 15, 1962 6 Sheets-Sheet 3

INVENTOR.
PIER GIORGIO PEROTTO

BY Kenyon & Kenyon
ATTORNEYS

April 13, 1965 P. G. PEROTTO 3,178,687

CHARACTER RECOGNITION APPARATUS

Filed May 15, 1962 6 Sheets-Sheet 4

INVENTOR.
PIER GIORGIO PEROTTO
BY
Kenyon & Kenyon
ATTORNEYS

INVENTOR.
PIER GIORGIO PEROTTO
BY Kenyon & Kenyon
ATTORNEYS

April 13, 1965 P. G. PEROTTO 3,178,687

CHARACTER RECOGNITION APPARATUS

Filed May 15, 1962 6 Sheets-Sheet 6

INVENTOR.
PIER GIORGIO PEROTTO

BY Kenyon & Kenyon
ATTORNEYS

United States Patent Office 3,178,687

Patented Apr. 13, 1965

3,178,687

CHARACTER RECOGNITION APPARATUS

Pier Giorgio Perotto, Turin, Italy, assignor to Ing. C. Olivetti & C., S.p.A., Ivrea, Italy, a corporation of Italy Filed May 15, 1962, Ser. No. 194,788
Claims priority, application Italy, May 19, 1961, 647,939
5 Claims. (Cl. 340—146.3)

The present invention relates to an apparatus for the automatic recognition of characters, for example for data processing systems.

The known apparatus are generally adapted to recognize only the characters having a well defined form, in practice only the characters printed with accuracy and shaped according to a form especially studied for being scanned by said apparatus.

On the other hand, the known apparatus adapted to recognize characters having a variable form, such as handwritten characters, are very intricate and expensive.

A general object of the invention is to provide a character recognition apparatus of comparatively simple structure and low cost.

Another object of the invention is to provide an apparatus for recognizing printed or handwritten characters having variable form.

A further object of the invention is to provide an apparatus for recognizing characters irrespective of their location, size and inclination.

According to the invention the apparatus for recognizing characters each one formed of a number of groups of lines, comprises in combination: means for scanning said character in a plurality of parallel scans for sensing segments of the character outline during each scan; means controlled by said scanning means for simultaneously and separately following all the said groups of lines; further means controlled by said scanning means for detecting the presence of predetermined shape elements within each group of lines; other means controlled by said scanning means for indicating for each scanned segment the group of lines to which said segment belongs; a register comprising for each one of said groups of lines a plurality of storage positions, each one corresponding to a shape element; and means jointly controlled by said detecting means and said indicating means for storing in said register for each one of said groups of lines an indication of the detected shape elements in the corresponding storage positions.

These and other objects and features of the invention will become apparent from the following description of a preferred embodiment thereof, which is particularly adapted for the recognition of the decimal digits, with reference to the annexed drawings, wherein:

FIG. 1 shows a block diagram of the apparatus;

FIGS. from 2 to 4 illustrate the recognition criteria for a character;

Figure 1:
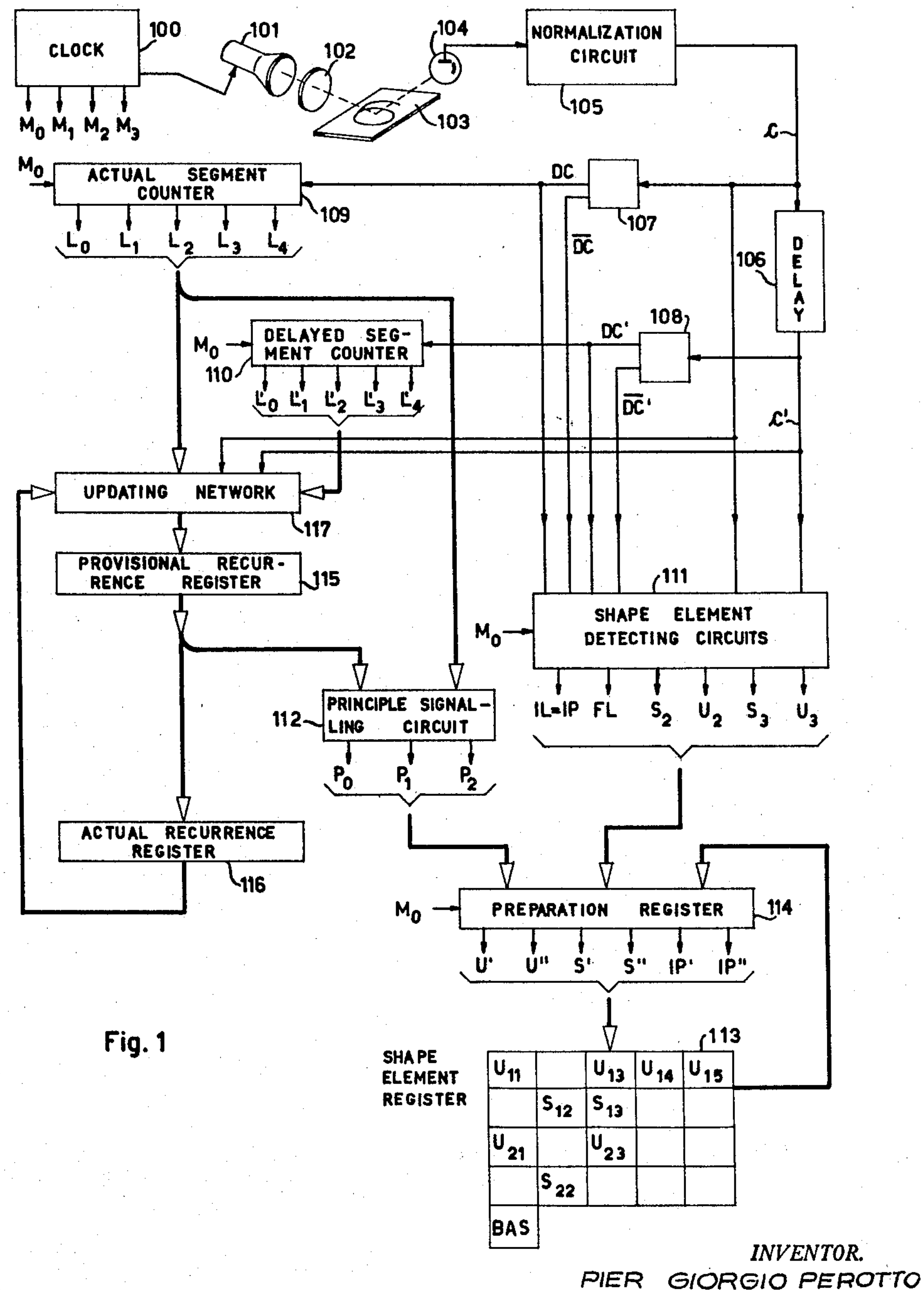
Figure 12:
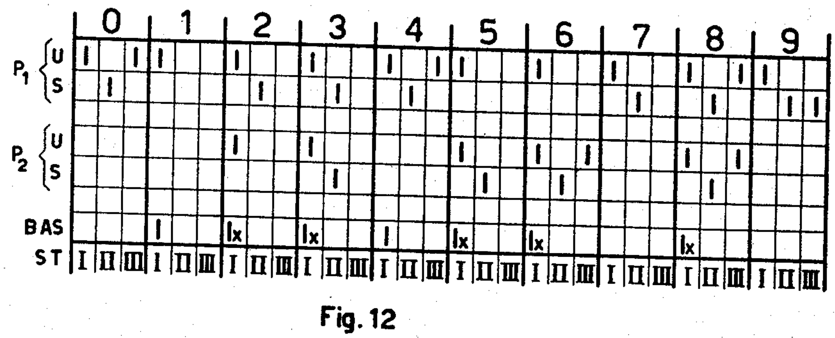

FIGS. from 7 to 11 show the details of some parts of the apparatus of FIG. 1;

FIG. 12 diagrammatically shows the presence of certain characteristic shape elements in each one of the digital characters from 0 to 9.

The character, which is printed or handwritten on a record 103 temporarily standing still, is scanned by means of a scanning system comprising a cathode-ray tube 101, a lens 102 projecting on the record 103 the light-beam produced by the tube 101, and a photo-multiplier tube 104 which receives the light reflected by the record. The light-beam scans the character in a plurality of scans, that is along a plurality of vertical lines or sections, for instance about thirty, from top to bottom and from right to left. The signal produced by the photo-multiplier tube 104 feeds a known normalization circuit 105 from which a binary signal *c* is obtained for each section, said signal having either the level "1" when a black zone of the black character outline is encountered in that section, or the level "0" when a white zone of the white character background is encountered. More particularly each black line encountered when scanning a section corresponds in the signal *c* to a tract having the level "1" and a duration corresponding to the vertical length of said line. Hereinafter said tract will be called "segment."

Figure 5:
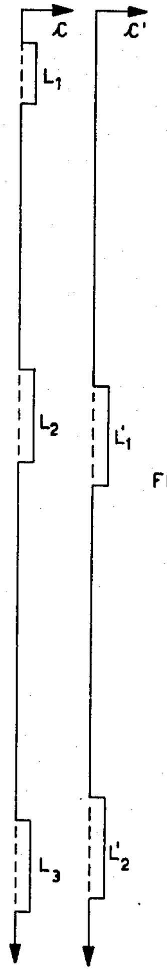
FIG. 5 shows the time diagram of some signals present in the device.
Figure 2:
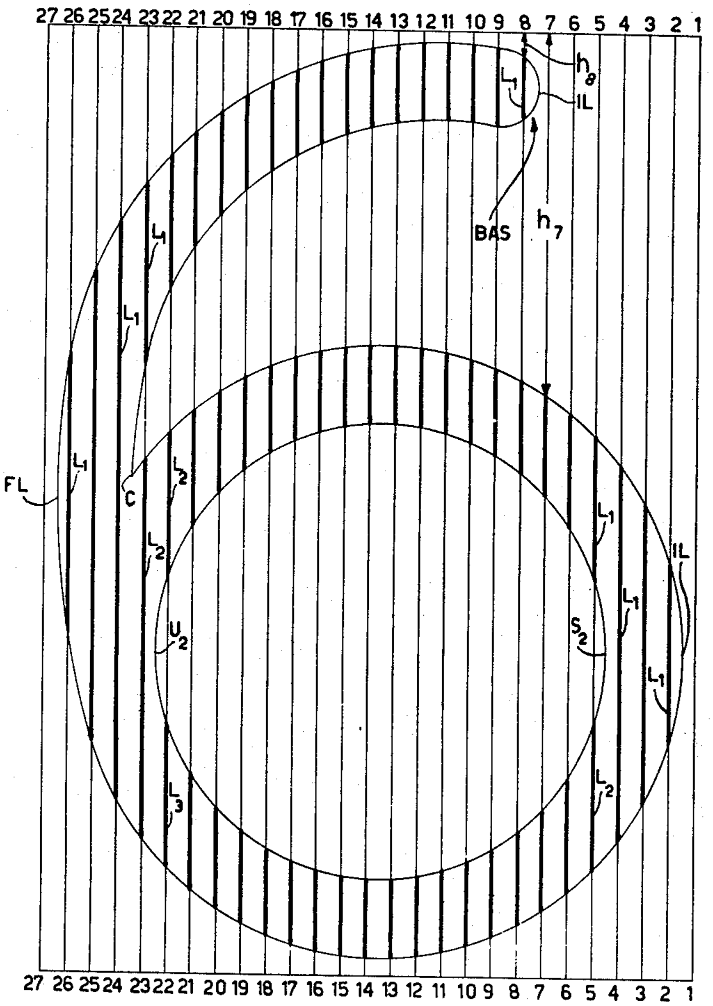

For the character shown in FIG. 2, for example two segments $L'_1$ and $L'_2$ are found in the section 7 and three segments $L_1$, $L_2$, $L_3$ are found in the section 8. The corresponding signals *c'* and *c* obtained when scanning said sections 7 and 8, respectively, are shown in FIG. 5.

The signal *c* produced by the normalization circuit 105 feeds a delay line 106 having a delay substantially equal to the time interval between the beginning of two subsequent vertical scans. Consequently, while at the input terminal of the delay line the signal *c* for the generic section K presently scanned is present, at the same time at the output terminal of the delay line the signal *c'* for the next preceding section K–1 is present. The simultaneous presence of said signals allows, as will be seen, the outline of the character to be followed from section to section.

Some definitions will now be introduced.

When a letter is used to indicate signals related both to the actually scanned section K and to the next preceding section K–1, the letter without a hyphen refers to the signals for said section K, while the same letter with a hyphen refers to the signals for said section K–1. A symbol having a bar placed thereon indicates a signal which is the reverse of the signal indicated by the same symbol without a bar. A segment of the section K or K–1 will be indicated by means of its serial number $L_n$ or $L'_n$, respectively, the segments being counted beginning from the top within the corresponding section (FIG. 5). A segment $L_m$ of the section K and a segment $L'_m$ of the section K–1 belong to each other when both the signals *c* and *c'* corresponding to said segments have a level "1" for at least a part of each one of the segments.

In a character some distinct shape elements may be present, namely (FIG. 2):

Beginning of a line (IL), when a segment of the section K does not belong to any segment of the preceding section K–1;

End of a line (FL), when a segment of the section K–1 does not belong to any segment of the following section K;

Line separation ($S_n$), when *n* segments of the section K belong to the same segment of the preceding section K–1, *n* being called the "order" of the separation;

Line union ($U_n$), when *n* segments of the section K–1 belong to the same segment of the following section K, *n* being called the order of the union.

Discontinuity BAS, when the distance *h* between the top edge of the character and the top edge of the zone scanned by the light beam exhibits a marked discontinuity (decrease) when passing from a section K–1 to the following section K, in practice when the difference $h_{K-1}—h_K$ is greater than a predeterminated limit H.

Each character is formed by a number of either one or more groups of lines or principles: a principle is defined as the line or the group of lines which begins with a shape element IL. The principles will be indicated with $P_1$, $P_2$ . . . progressively from the top edge of the character to the bottom edge.

Finally, a contact C is the union (as above defined) of two lines belonging to different and adjacent principles.

By applying the preceding definitions to the digits from 0 to 9, each digit may be identified on the basis of the presence in it of one or more principles and of the presence in each principle of some shape elements. More particularly, each principle is subdivided in turn into zones, it being understood that the first zone of a principle begins in the section wherein the same principle begins and ends in the section wherein a shape element S is detected for the first time and that thereafter a section ends and the next following section begins when either a shape element U or S is detected.

The symbol $S_{ij}$ or $U_{ij}$ indicates that within the *i*th principle the *j*th zone begins with a line separation or line union, respectively. The symbol $U_{i1}$ will indicate the beginning of the principle *i*th.

To illustrate the preceding definitions the digit 6 of FIG. 2 will now be considered.

Figure 3:
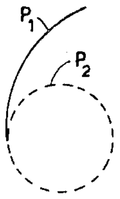

The segment $L_1$ of the section 2 does not belong to any segment of the section 1; therefore, the section 2 displays a shape element "beginning of a line" IL and consequently the beginning IP of a principle $P_2$ as well, which principle comprises the dotted line of FIG. 3.

Likewise, the segment $L_1$ of the section 8 does not belong to any segment of the section 7, whereby in the section 8 there is a shape element IL and consequently the beginning IP of a principle $P_1$ as well, which principle comprises the continuous line of FIG. 3. Since the beginning of this principle is located higher than the beginning of the former principle, this latter has been called $P_1$ and the former $P_2$.

Both segments $L_1$ and $L_2$ of the section 5 belong to the segment $L_1$ of the section 4; therefore, the section 5 displays a shape element "line separation" $S_2$. Thus, the first zone of the principle $P_2$ ends in this section, while the second zone begins.

The distance between the top edge of the character and the top edge of the rectangular area scanned by the light beam decreases abruptly when passing from the section 7 to the section 8, from the value $h_7$ to the much lower value $h_8$. Therefore, in the section 8 a discontinuity BAS appears.

Both segments $L_2$ and $L_3$ of the section 22 belong to the segment $L_2$ of the section 23, whereby the section 23 displays a shape element "line union" $U_2$. Therefore, the second zone of the principle $P_2$ ends in this section while its third zone begins.

Both segments $L_1$ and $L_2$ of the section 23, which belong to the principles $P_1$ and $P_2$, respectively, belong to the segment $L_1$ of the section 24; therefore the section 24 displays a contact C between the principles $P_1$ and $P_2$.

The segment $L_1$ of the section 26 does not belong to any segment of the section 27; therefore, the section 27 displays a shape element "end of line" FL.

Consequently, during the scanning of the character 6 of FIG. 2 the following shape elements are found:

The beginning of a principle $P_1$ which will be indicated with the symbol $U_{11}$;

The beginning of a principle $P_2$ which will be indicated with the symbol $U_{21}$;

A discontinuity BAS;

A contact C between the principles $P_1$ and $P_2$; furthermore, within the second principle:

A line separation $S_{22}$;

A line union $U_{23}$.

Therefore, the character 6 of FIG. 2 may be represented by the following characteristic table, which identifies the character and which is based on the assumption of a maximum number of two principles for each character and of five zones for each principle.

| | | | | |
|---|---|---|---|---|
| $U_{11}=1$<br>$S_{11}=0$<br>$U_{21}=1$<br>$S_{21}=0$<br>BAS=1 | $U_{12}=0$<br>$S_{12}=0$<br>$U_{22}=0$<br>$S_{22}=1$ | $U_{13}=0$<br>$S_{13}=0$<br>$U_{23}=0$<br>$S_{23}=0$ | $U_{14}=0$<br>$S_{14}=0$<br>$U_{24}=0$<br>$S_{22}=0$ | $U_{15}=0$<br>$S_{15}=0$<br>$U_{25}=0$<br>$S_{25}=0$ |

Likewise, another characteristic table identifies any other character to be recognized. In the diagram of FIG. 12, which shows the line unions and line separations of each principle of each decimal digit as well as the discontinuities of each digit, the symbol "1" indicates the presence of a shape element, said symbol "1" being accompanied by an X when the presence of the shape element is not relevant in the recognition of the character. In FIG. 12 each digit comprises only three zones ST, which is, for instance, the case of the digits printed by conventional book-keeping machines.

The structure of the apparatus will now be described.

A generator of clock or time signals 100 (FIG. 1) produces on its output terminals $M_0$, $M_1$, $M_2$ and $M_3$ a sequence of four time signals $M_0$, $M_1$, $M_2$ and $M_3$ respectively, said sequence being repeated once for each scanned section. The tube 101 is synchronized with the generator 100 in such a way that during the time interval between a signal $M_0$ and the following signal $M_1$ the light beam scans a section, and that in the time interval between the scanning of two contiguous sections the light beam returns rapidly to the starting point.

The signal *c* feeds a differentiating circuit 107 adapted to provide on the outputs DC and $\overline{DC}$ a short pulse at the beginning and at the end, respectively of each segment of the actually scanned section. Likewise, the signal *c'* feeds a differentiating circuit 108 adapted to provide on the output DC' and $\overline{DC}'$ a short pulse at the beginning and at the end, respectively, of each segment of the previously scanned section.

The signal DC feeds an actual segment counter 109 for the actually scanned section, which counter before the scanning of each section of the character is reset by the pulse $M_0$ to a start conditon wherein its output $L_0$ is energized. Upon the beginning of the first segment of the section the corresponding pulse DC energizes the output $L_1$ and deenergizes the output $L_0$. Likewise, upon the beginning of the second segment the output $L_1$ is deenergized while the output $L_2$ is energized and so on for the subsequent segments. Similarly, the signal DC feeds a delayed segment counter 110 for the previously scanned section, which counter before the scanning of each section is reset by the pulse $M_0$ to a start condition wherein the output $L'_0$ is energized; upon the beginning of the first segment the corresponding signal DC' energizes the output $L'_1$ and deenergizes the output $L'_0$; similarly, upon the beginning of the second segment the output $L'_1$ is deenergized while the output $L'_2$ is energized and so on.

The signals *c* and *c'* and the signals DC, DC', $\overline{DC}$ and $\overline{DC}'$ obtained therefrom feed a shape element detecting circuit 111, which is adapted to provide on each one of its output terminals IL, FL, $S_2$, $U_2$, $S_3$, $U_3$ a signal when in the actually scanned section the corresponding shape element is detected. The shape detecting circuit 111 is reset by the signal $M_0$ before the scanning of each section.

A principle signalling circuit 112 is adapted to indicate the principle to which the actually scanned area of the character outline belongs. More particularly, the output $P_0$ of the principle signalling circuit 112 remains energized from the beginning of the scanning of the section until the presence of the principle $P_1$ is detected: then the output $P_0$ is deenergized while the output $P_1$ is energized. The output $P_2$ is energized when the presence of the principle $P_2$ is detected and so on.

A shape element register 113 is adapted to provide for each scanned character the aforementioned characteristic table; it comprises a flip-flop for each one of the symbols of the table which may assume the value "1." At the beginning of the scanning of the character each flip-flop is set to the "0" state by a signal $M_1$, which indicates the beginning of the character. Thereafter, the detection of each shape element of the character causes the flip-flop located in the line corresponding to the type of shape element (U or S or BAS) and to the principle wherein said shape element has been detected and in the column corresponding to the zone wherein said shape element has been detected, to be set to the state "1."

The setting of the flip-flops of the register 113 is controlled by a preparation register 114, which is reset by the pulse $M_0$ at the beginning of the scanning of each section and which during the scanning of said section energizes either the output U′ when a shape element U is detected within the first principle $P_1$, or the output U″ when a shape element U is detected in the second principle $P_2$, or the output S′ when a shape element S is detected in the first principle $P_1$, or the output S″ when a shape element S is detected in the second principle $P_2$, or the output IP′ when the beginning IP of the principle $P_1$ is detected, or finally the output IP″ when the beginning IP of the principle $P_2$ is detected.

To this end the shape element detecting circuit 111 indicates to the preparation register 114 the detection of each shape element, whereas the principle signalling circuit 112 indicates the principle belonging to the character area wherein said shape element is detected. Furthermore, the register 114 is controlled by the shape element register 113 as will be described later.

It has been seen that the task of the principle signalling circuit 112 is to indicate which is the principle to which the actually scanned area of the character belongs.

Now, in each section either segments belonging to principles started in preceding sections, or segments which correspond to the beginning of new principles, or both may be found.

Assuming the principle is known to which each segment of the section K–1 belongs, it is now necessary to know to which principle each segment of the next following section K belongs, in order to furnish the corresponding indication to the principle signalling circuit. In this way, as the scanning of the character proceeds from right to left, it will be possible to simultaneously and separately follow the principles and to recognize the continuity of all the lines forming the character and to know to which principle they belong.

To indicate that the generic segment $L_m$ belongs to the principle $P_i$ the symbolic expression "$P_iL_m=1$" will be used. It is thus possible to establish the following recurrence rules:

(*a*) If in the section K the segment $L_n$ belongs to the segment $L'_m$ of the preceding section K–1 (where *m* and *n* are either equal or not), and if until the scanning of said segment $L_n$ no new principle has actually begun in the section K and if $P_iL'_m=1$, then also $P_iL_n=1$;

(*b*) If, on the contrary, in the section K the segment $L_n$ belongs to the segment $L'_m$ of the preceding section K–1 (where *m* and *n* are either equal or not), and if before the scanning of said segment $L_n$ a new principle has begun in the section K, and if $P_iL'_m=1$, then also $$P_{i+1}L_n=1$$

whereby the serial number of the principle to which the segment $L_n$ belongs should be increased one unit.

In order to control the principle signalling circuit 112 according to the aforesaid recurrence rules, a provisional recurrence register 115, an actual recurrence register 116 and an updating network 117 are provided.

The provisional recurrence register 115 indicates to which principle each segment of the actually scanned section belongs. The actual recurrence register 116 indicates to which principle each segment of the previously scanned section belongs.

The updating network 117, which receives from the register 116 an indication of the status of said register 116, from the signals *c* and *c′* and from the segment counters 109, 110 an indication of the simultaneous occurrence of character segments in contiguous sections, and from the circuit 111 an indication IP of the beginning of the principles, is arranged to write in the provisional register 115 the conditions corresponding to the actually scanned section.

The provisional recurrence register (FIG. 7) comprises a plurality of flip-flops $P_1L_1$, $P_1L_2$, $P_1L_3$, $P_2L_1$, $P_2L_2$, $P_2L_3$ and $P_2L_4$.

Figure 6:
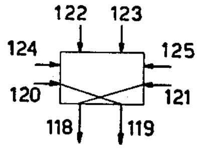
FIG. 6 shows the symbol of a flip-flop in the apparatus.

The flip-flops used in the present device comprise a direct output 118 (FIG. 6) and a reverse output 119. When the direct output is energized the flip-flop is said to be energized. A signal present at the input 120 or 121 energizes or deenergizes, respectively, the flip-flop.

An impulsive signal present at the input 122 or 123 energizes or deenergizes respectively, the flip-flop, provided an enabling signal is simultaneously present at the input 124 or 125, respectively. A generic flip-flop $P_iL_m$ when energized indicates that the segment $L_m$ of the scanned section belongs to the principle $P_i$, that is $P_iL_n=1$, as seen above. The flip-flops of the register 115 are deenergized by the pulse $M_0$ before scanning each section.

The actual recurrence register 116 (FIG. 7) comprises a plurality of flip-flops $P_1L'_1$, $P_1L'_2$, $P_1L'_3$, $P_2L'_1$, $P_2L'_2$, $P_2L'_3$ and $P_2L'_4$. A generic flip-flop $P_iL'_m$ when energized indicates that the segment $L'_m$ of the previously scanned section belonged to the principle $P_i$. The flip-flops of the register 116 are deenergized by the pulse $M_1$ at the end of the scanning of each section; the subsequent pulse $M_2$ causes the contents of the register 115 to be transferred into the register 116.

Figure 7:
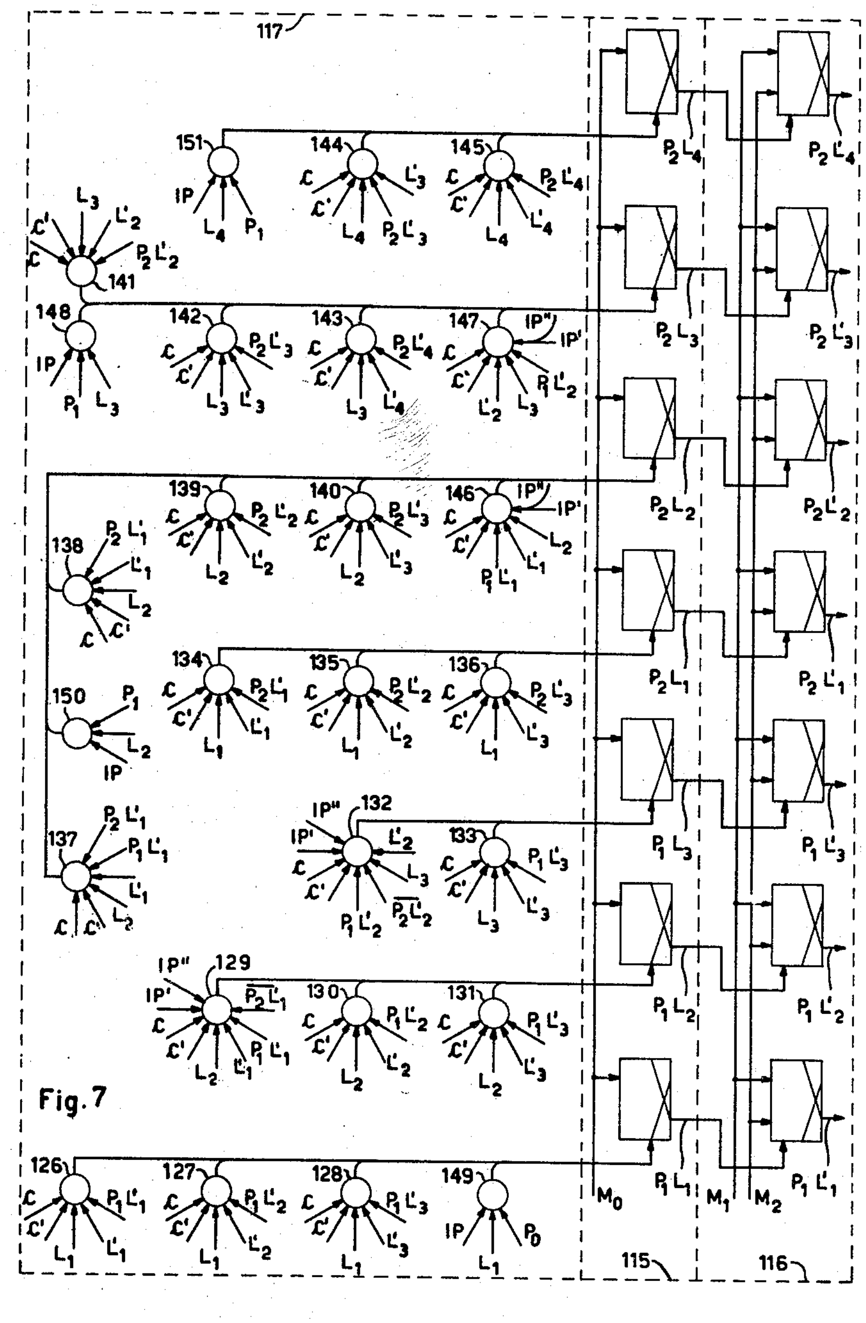

The updating network 117 comprises a plurality of "and" gates from 126 to 151, which are connected to the flip-flops of the register 115 as shown in FIG. 7. The "and" gates from 126 to 145 control the energization of the flip-flops of the register 115 according to the recurrence rule (*a*) above established. For instance, with reference to FIG. 2, in the section 23 there is a segment $L_2$ which belongs to the segment $L_2$ of the section 22, the latter segment belonging to the principle $P_2$. Therefore, during the scanning of said segment $L_2$ of the section 23 the coincidence of the following signals will occur: signal *c* indicating that in the section 23 a segment is being scanned; signal $L_2$ produced by the segment counter 109 and indicating that said segment is the second of the section; signal *c′* indicating that in the section 22 and at a corresponding height a black segment was found; signal $L'_2$ produced by the segment counter 110 and indicating that this latter segment was the second of its section; signal $P_2L'_2$ produced by the flip-flop labeled $P_2L'_2$ of the register 116 which has been energized at the end of the scanning of the preceding section 22, and indicating that this latter segment belonged to the principle $P_2$. The coincidence of all these signals energizes the output of the "and" circuit 139, thus energizing the flip-flop $P_2L_2$ to indicate that also the segment $L_2$ now scanned belongs to the principle $P_2$.

Likewise, the "and" gates from 146 to 151 control the energization of the flip-flops of the register 115 according to the aforesaid rule (*b*).

Figure 8:
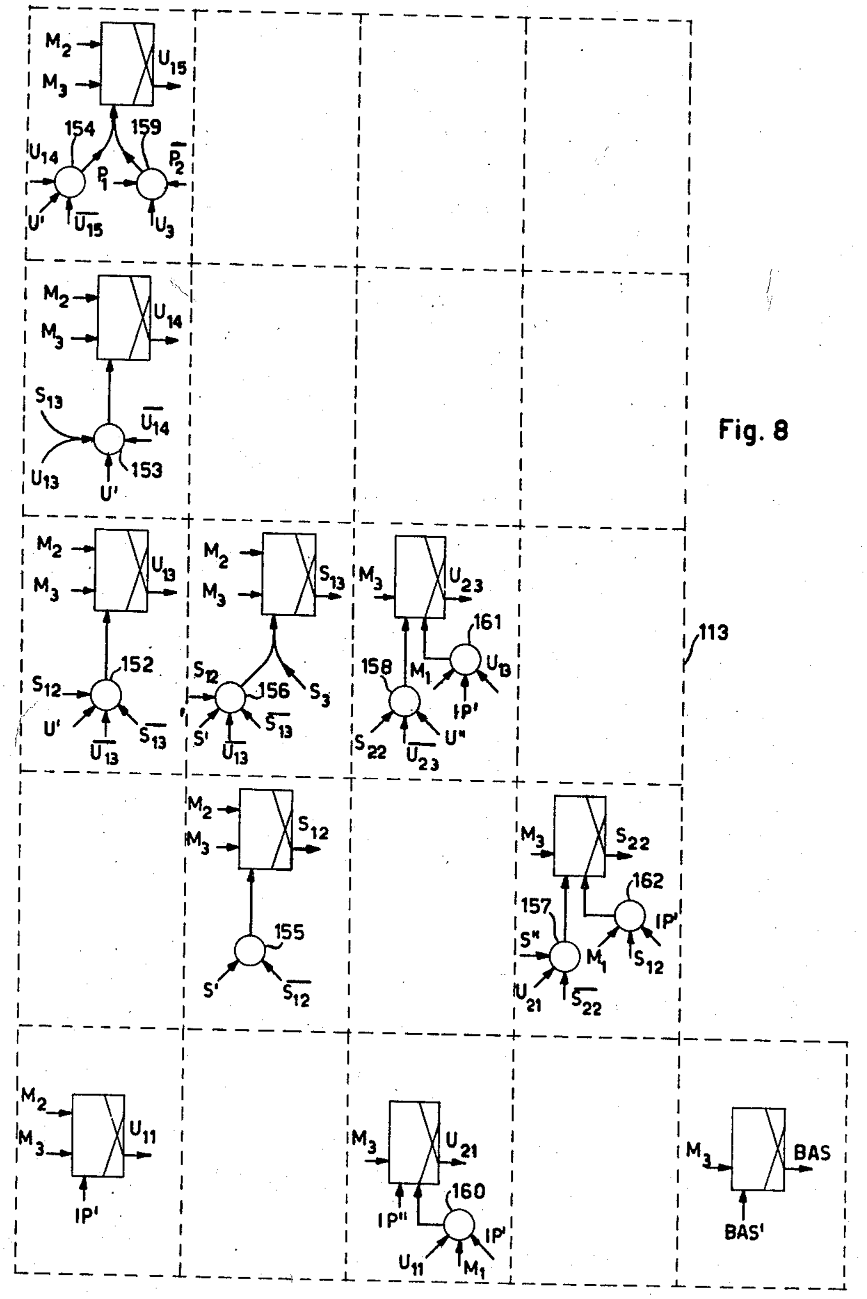

The shape element register 113 (FIG. 8) comprises a flip-flop for each one of the symbols $U_{11}$, $U_{13}$, $U_{14}$, $U_{15}$, $S_{12}$, $S_{13}$, $U_{21}$, $U_{23}$, $S_{22}$ and BAS of the characteristic table, said symbols being the only symbols which for the characters having a common style may in practice assume the value "1." The energization of the flip-flops of the shape element register occurs during the pulse $M_3$.

More particularly, if the preparation register 114 energizes the output IP′ or IP″ so as to indicate that in the actually scanned section the beginning of a principle $P_1$ or $P_2$, respectively, has been found, the flip-flop $U_{11}$ or the flip-flop $U_{21}$ of the register 113, respectively, is energized when receiving the pulse $M_3$.

It has been seen that the preparation register 114 signals the presence of the shape elements and that simultaneously indicates to which principle they belong. To build up the characteristic table of the character it is further necessary to distribute the shape elements according to the zone wherein they occur.

More particularly, within each principle $P_i$ the energization of either a flip-flop $U_{ij}$ or $S_{ij}$ of the $j$th column of the shape element register means, as it has been seen above, that the $j$th zone begins with a shape element U or S, respectively. Thereafter, as another shape element U or S occurs, the next zone $j+1$ begins, whereby the occurrence of said shape element is to be recorded in the column $j+1$ of the register 113.

It will thus be clear that within each principle the energization of a flip-flop in the $j$th column of the register 113 automatically conditions the energization of the flip-flops of the column $j+1$ and only these flip-flops.

This function is secured by a plurality of "and" gates 152 to 158, which are connected each one to a flip-flop of the register 113. More particularly, an "and" gate 152 to 158 connected to a flip-flop of the column $j+1$ is conditioned to transmit to said flip-flop the signal U', S', U'', S'' produced by the preparation register 114 only if in the column $j$ a flip-flop is energized and in the column $j+1$ no flip-flop is energized.

When a shape element $U_3$ or $S_3$ occurs, it is entered into the register 113 as a sequence of two shape elements $U_2$ and $S_2$, respectively. For instance, within the first principle $P_1$, if the first zone begins with a shape element S' the occurrence of said shape element is recorded in the flip-flop $S_{12}$ through the "and" gate 155. If said separation S is of the order 3, that is, if the output $S_3$ of the shape element detecting circuit 111 is energized, upon the occurrence of the pulse $M_2$ the signal $S_3$ energizes also the flip-flop $S_{13}$.

Likewise, if the fourth zone of the principle $P_1$ begins with a shape element U, this element is entered into the flip-flop $U_{14}$. If said union is of the order 3, that is, if the output $U_3$ of the shape element detecting circuit 111 is energized, upon the occurrence of the pulse $M_3$ the signal $S_3$ also energizes the flip-flop $U_{15}$ through an "and" gate 159.

It has been seen that the principles are sequentially numbered from the top edge to the bottom edge of the character.

In some cases, for example in the case of the character 6 of FIG. 2, the beginning of the principle $P_2$ occurs in a section which precedes the section in which the principle $P_1$ begins. Therefore, until the beginning of the principle $P_1$ proper the principle $P_2$ will be interpreted by the device as first principle $P_1$ and the shape elements which occur therein will be entered into the flip-flops of the register 113 allotted to the first principle.

But at the end of the section wherein the beginning of the principle $P_1$ proper occurs, the output IP' of the shape element detecting circuit will be energized, whereby in the register 113 upon occurrence of the pulse $M_1$ the contents of the flip-flops allotted to the first principle will be transferred through the "and" gates 160, 161, 162, into the corresponding flip-flops alotted to the second principle, so as to reestablish in the register 113 the exact distribution of the shape elements in the different principles.

Generally, whatever the number of principles may be, when in a section the beginning of a new principle occurs, the whole contents of the register 113 must be shifted one principle to obtain the exact numbering of the same principles.

Assuming that when passing from the section K–1 to the section K the beginning of a shape element IL, FL, S or U is found, then if the sections of the character are scanned in the reverse order, that is from left to right so as to pass from section K to section K–1, a shape element FL, IL, U or S, respectively, will be found. Therefore, the circuit adapted to detect the shape elements IL, $S_2$ or $S_3$ will be like the circuit adapted to detect the shape element FL, $U_2$ or $U_3$, respectively. The circuits for detecting the shape elements IL, $S_2$ and $S_3$ and, at the same time, with reference to the symbols hereinafter indicated between brackets, the circuits for detecting the shape elements FL, $U_2$ and $U_3$ will now be briefly described.

Figure 9:
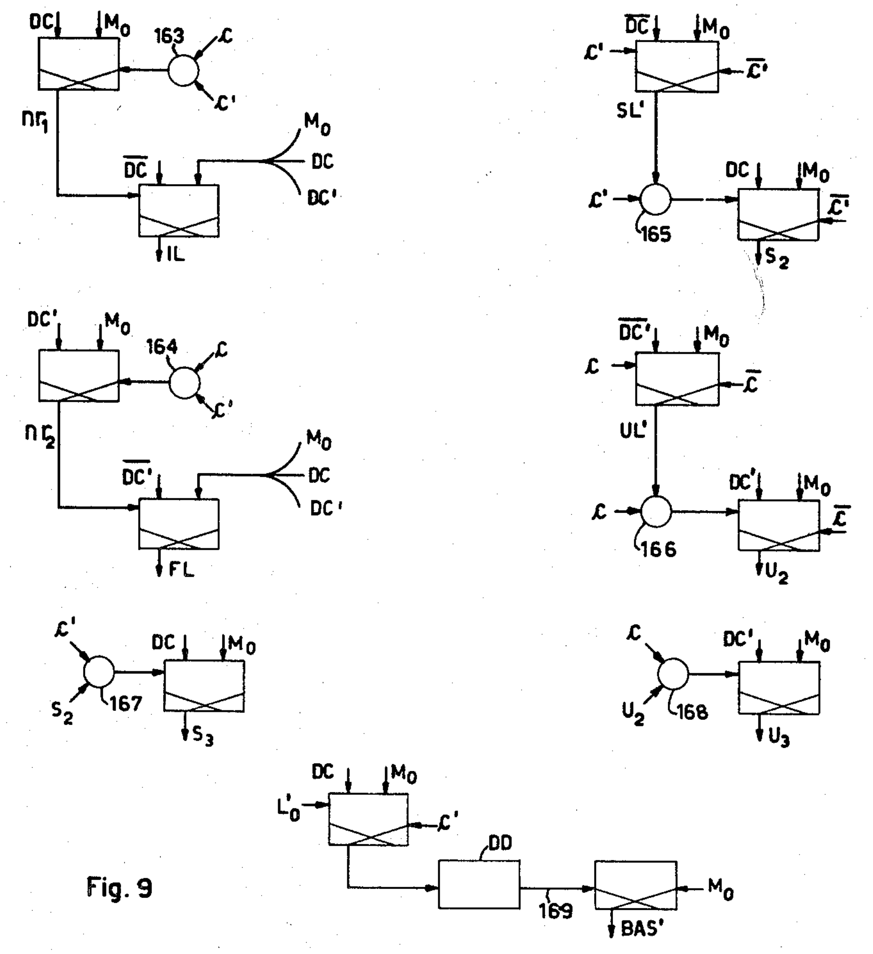

*Shape elements IL and FL.*—When in a section K (K–1) whichever segment begins, the signal DC (DC') indicating the beginning of said segment (FIG. 9) energizes a flip-flop $nr_1$ ($nr_2$). If during said segment the coincidence of the signals $c$ and $c'$ occurs, that is if said segment of the section K (K–1) belongs to a segment of the section K–1 (K), the flip-flop $nr_1$ ($nr_2$) is deenergized through an "and" gate 163 (164) whereby its prior energization, if any, remains ineffective. If, on the contrary, before the end of said segment of the section K (K–1) said coincidence does not occur, the signal $\overline{DC}$ ($\overline{DC'}$) indicating the end of the segment energizes a flip-flop IL (FL) thus indicating that a shape element IL (FL) occurred. Thereafter the flip-flop IL (FL) is deenergized by the first signal DC or DC' which appears either in the actually scanned section or in the preceding one, respectively, so as to be ready to indicate a new shape element IL (FL), if any, in said section.

*Shape elements $S_2$, $S_3$, $U_2$ and $U_3$.*—If, while a signal $c'$ ($c$) is present to indicate the presence of a segment in the section K–1 (K), the end signal $\overline{DC}$ ($\overline{DC'}$) of a segment of the section K (K–1) occurs, a flip-flop SL' (UL') is energized. Then, if the signal $c'$ ($c$) ends before in the section K (K–1) a new segment begins, the flip-flop SL' (UL') is deenergized by the signal $\overline{c}'$ ($\overline{c}$) and its energization, if any, remains ineffective. On the other hand, when the flip-flop SL' (UL') is in the energized state, as long as the signal $c'$ ($c$) is present the output of an "and" gate 165 (166) remains energized. Therefore, if before the end of said signal $c'$ ($c$) a signal DC (DC') indicating the beginning of a new segment in the section K (K–1) occurs, a flip-flop $S_2$ ($U_2$) is energized to signal that a shape element $S_2$ ($U_2$) occurred. At the end of said signal $c'$ ($c$) the flip-flop $S_2$ ($U_2$) is deenergized by the signal $\overline{c}'$ ($\overline{c}$) to be ready to signal a new shape element $S_2$ ($U_2$), if any, in said section.

However, if after the aforesaid energization of the flip-flop $S_2$ ($U_2$) and while the signal $c'$ ($c$) of said segment of the section K–1 (K) is still present, the signal DC (DC') indicating the beginning of a new segment of the section K (K–1) occurs, a flip-flop $S_3$ ($U_3$) is energized through an "and" gate 167 (168) to signal that a shape element $S_3$ ($U_3$) occurred.

*Shape element BAS.*—If, when scanning a section K the signal DC indicating the beginning of the first segment occurs while the output $L'_0$ of the segment counter 110 (FIG. 1) is energized, that is if at the beginning of said segment of the section K no segment has yet occurred in the section K–1, a flip-flop D (FIG. 9) is energized by the signal DC.

The signal obtained from the flip-flop D is fed to a length discriminator DD adapted to provide a pulse on the output 169 only if said signal has a longer duration than a predetermined threshold interval T equal to the time required by the light beam to cover the limit distance H previously introduced when defining the shape element BAS.

If, in a time interval equal to T measured from said signal DC, no signal $c'$ occurs to indicate the presence of a segment in the section K–1, the duration of the signal obtained from the flip-flop D overcomes said threshold duration, whereby the output 169 is energized to energize a flip-flop BAS' adapted to signal the occurrence of the shape element BAS.

If, on the contrary, a signal $c'$ occurs within said interval, by deenergizing the flip-flop D it will prevent the signal produced by the same flip-flop from reaching said threshold duration, whereby no shape element BAS will be signalled. All the flip-flops of the shape element detecting circuit 111 are deenergized by the pulse $M_0$ at the end of each section.

Figure 11:
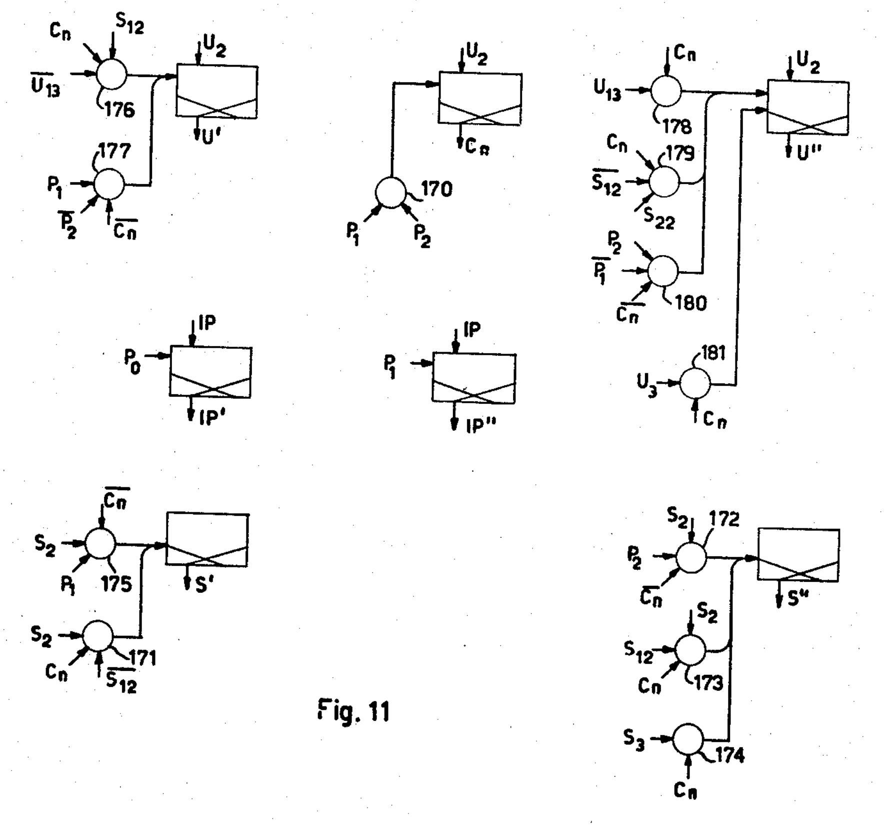

The preparation register 114 comprises a plurality of flip-flops U', U'', S', S'', IP' and IP'' whose output terminals constitute the outputs of the register itself (FIG. 11).

A flip-flop $C_n$ is energized every time a contact C between two principles occurs, and thereafter remains energized until the beginning of the next following character. More particularly, the flip-flop $C_n$ is energized by the signal $U_2$ produced by the shape element detecting circuit 111 and indicating that a line union $U_2$ occurred, provided the principle signalling circuit 112 indicates the simultaneous presence of the principles $P_1$ and $P_2$ so as to energize both input terminals of the coincidence circuit 170.

During the scanning of a character, the flip-flop $C_n$ remains deenergized until a contact among different principles occurs, whereby the outputs of the "and" gates 171, 173, 174, 176, 178, 179, 181 are certainly deenergized, while the output of the "and" gates 177, 180, 175 and 172 may be energized. Therefore, when the shape element detecting circuit emits a signal $U_2$, this signal will energize either the flip-flop U or the flip-flop U″ according as to whether the principle $P_1$ or the principle $P_2$, respectively, is actually scanned, that is according as to whether the output of the "and" circuit 177 or 180, respectively, is energized.

Likewise, when the shape element detecting circuit emits a signal $S_2$, this signal will energize either the flip-flop S′ or the flip-flop S″ according as to whether the principle $P_1$ or the principle $P_2$, respectively, is actually scanned, that is according as to whether the output of the "and" gate 175 or 172, respectively, is energized.

Figure 4:
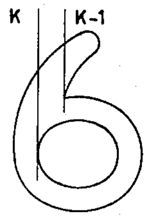

When in a character a contact between two principles occurs, for the character lines departing leftwards from the contact point the allotment to either principle is arbitrary. For example, in the case of FIG. 4 the part of character outline located on the left hand of the section K–1, wherein a contact occurs, may be allotted at will either to the principle $P_1$ or to the principle $P_2$. More particularly, the shape element U which appears in the section K may be allotted either to the principle $P_1$ or to the principle $P_2$.

The uncertainty is eliminated in the present apparatus by so arranging the preparation register 114 as to allot the shape elements U or S which occur after a contact, either to one or to the other principle according to an arbitrary criterion to be described.

When scanning the character, after a contact $C_n$ appears, the flip-flop $C_n$ is activated so as to deenergize the output terminals of the "and" gates 177, 180, 175 and 172, whereas the output terminals of the "and" gates 171, 173, 174, 176, 178, 179, 181 may be energized.

Therefore, if a line separation S occurs, and if up to this time in the first principle no separation occurred, so that no signal $S_{12}$ is obtained from the shape element register 113, then through the "and" gate 171 the flip-flop S′ (FIG. 11) is energized, whereby the new separation is allotted to the first principle. If on the contrary, a separation occurred in the first principle, so that the signals $S_{12}$ is present, then through the "and" gate 173 the flip-flop S″ is energized, whereby the new separation is allotted to the second principle.

If, on the other hand, a union U occurs, and if a separation already occurred in the first principle, while no union occurred (that is if the signal $S_{12}$ is present and the signal $U_{13}$ is absent), then through the "and" gate 176 the flip-flop U′ is energized, whereby said union is allotted to the first principle. If, on the contrary, when said union U occurs, in the first principle a line union already appeared (that is if the signal $U_{13}$ is present), then through the "and" gate 178 the flip-flop U″ is energized, whereby said union is allotted to the second principle.

If said union U occurs while in the first principle no separation has yet occurred, whereas in the second principle a separation is already occurred (that is if the signal $S_{22}$ is present and the signal $S_{12}$ is absent), then through the "and" gate 179 the flip-flop U″ is energized, whereby said union is likewise alloted to the second principle.

If after a contact $C_n$ either a union of the order 3, or a separation of the order 3 occurs, through the "and" gate 181 or 174, respectively, the flip-flop U″ or S″, respectively, is energized, whereby a union or separation, respectively, is allotted to the second prinpicle.

Figure 10:
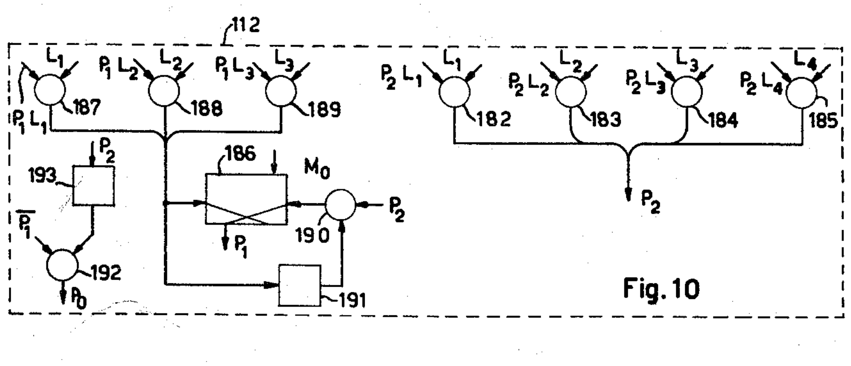

In the principle signalling circuit 112 (FIG. 10) the output $P_2$ is fed by the "and" gates 182 to 185, which in turn are fed both by the flip-flops $P_2L_1$, $P_2L_2$, $P_2L_3$, $P_2L_4$, of the provisional recurrence register 115 and by the output terminals $L_1$, $L_2$, $L_3$, $L_4$, respectively, of the segment counter 109.

Assuming, for instance, that the flip-flop $P_2L_1$ is energized, thereby indicating that the segment $L_1$ of the actually scanned section belongs to the principle $P_2$, then when scanning the segment $L_1$ the output of the "and" gate 182 remains energized so as to indicate, by activating the output $P_2$, that the second principle is present. The operation of the "and" gates 183, 184 and 185 is similar.

The output $P_1$ is formed of the output of a flip-flop 186 controlled by the "and" gates 187, 188, 189.

The flip-flop 186 is deenergized by the pulse $M_0$ before scanning each section and is thereupon energized by the output of the "and" gate 187, 188, or 189, whose mode of operation is similar to the mode of operation of the "and" gates from 182 to 185.

The flip-flop 186 is finally deenergized by the signal $P_2$, through an "and" gate 190, as soon as all the output terminals of the "and" gates 187, 188 and 189 are deenergized. To this end the "and" gate 190 is controlled by said output terminals through an inverter 191.

The output $P_0$ is formed of the output of an "and" gate 192. Since this gate is fed by the output $P_1$ of the flip-flop 186 and, through an inverter 193, by the output $P_2$, the output $P_0$ is adapted to be energized when neither the output $P_1$ nor the output $P_2$ are energized.

From the above description it is apparent that the contents of the shape element register 113 after scanning a character represents the character itself. In the present embodiment said representation is made of a set of ten bits, which are stored in the ten flip-flops of FIG. 8 respectively.

By means of a suitable decoding system fed by the output terminals of said flip-flops the representation, in any desired code, of the recognized character may be obtained.

The described apparatus may be modified to be adapted to use a greater number of shape elements, principles and zones as a criterion for recognizing more complex characters; for instance, besides the aforementioned shape element C, which in the present embodiment has not been introduced into the characteristic table because it is redundant in the recognition of conventional characteris, other shape elements may be defined such as a discontinuity ABI similar to the discontinuity BAS previously defined, wherein the distances $h$ are measured between the bottom edge of the character and the bottom edge of the scanned area, or by a discontinuity wherein the distance $h_k$ is greater than the distance $h_{k-1}$, and so on.

Furthermore, the definition itself of a principle may be modified, by defining for instance as the beginning of a principle not only the beginning of a line IL, but also each shape element BAS or ABI.

Also the scanning device may be modified. For instance, in the case of magnetic characters a multiple magnetic head with a vertical air gap may be substituted for the tube 101, said head being connected to a device adapted to sequentially present to the normalization circuit 105 the signals simultaneously obtained from the various elementary magnetic heads.

It is intended that many changes, additions of parts and improvements may be made to the above described machine without departing from the scope thereof.

What I claim is:

1. Apparatus for recognizing characters each one formed of a number of groups of lines, comprising in combination:
(*a*) means for scanning said character in a plurality of parallel scans for sensing segments of the character outline during each scan;
(*b*) means controlled by said scanning means for simultaneously and separately following all the said groups of lines;
(*c*) further means controlled by said scanning means for detecting the presence of predetermined shape elements within each group of lines;
(*d*) other means controlled by said scanning means for indicating for each scanned segment the group of lines to which said segment belongs;
(*e*) a register comprising for each one of said groups of lines a plurality of storage positions, each one corresponding to a shape element;
(*f*) and means jointly controlled by said detecting means and said indicating means for storing in said register for each one of said groups of lines an indication of the detected shape elements in the corresponding storage position.

2. Apparatus for recognizing characters each one formed of a number of groups of lines, comprising in combination:
(*a*) means for scanning said character in a plurality of parallel scans for sensing segments to the character outline during each scan to produce segment signals;
(*b*) delay means fed by said scanning means for producing delayed segment signals corresponding to a previous scan;
(*c*) a first register for storing for each segment of said previous scan an indication of the group of lines to which said last mentioned segment belongs;
(*d*) a second register for storing for each segment of the present scan an indication of the group of lines to which said last mentioned segment belongs;
(*e*) means for detecting the beginning of each group of lines;
(*f*) an updating network jointly controlled by said scanning means, said delay means, said detecting means and said first register for modifying the contents of said second register;
(*g*) means responsive to said scanning means for detecting the presence of predetermined shape elements within each group of lines;
(*h*) a third register comprising for each one of said groups of lines a plurality of storage positions, each one corresponding to a shape element;
(*i*) and means jointly controlled by said shape element detecting means and by said second register for storing in said third register for each one of said groups of lines an indication of the detected shape elements in the corresponding storage positions.

3. Apparatus for recognizing characters each one formed of a number of groups of lines, comprising in combination:
(*a*) means for scanning said character;
(*b*) means controlled by said scanning means for simultaneously and separately following all the said groups of lines;
(*c*) further means controlled by said scanning means for detecting the presence of predetermined shape elements within each group of lines;
(*d*) means controlled by said scanning means for indicating for each detected shape element the group of lines to which said shape element belongs;
(*e*) a register comprising for each one of said groups of lines a plurality of storage positions, each one corresponding to a shape element;
(*f*) and means jointly controlled by said detecting means and said indicating means for storing in said register for each one of said groups of lines an indication of the detected shape elements in the corresponding storage positions.

4. Apparatus for recognizing characters, each one formed of a number of groups of lines, comprising in combination:
(*a*) means for scanning said character in a plurality of parallel scans for sensing segments of the character outline during each scan to produce segment signals;
(*b*) delay means fed by said scanning means for producing delayed segment signals;
(*c*) means responsive to said segment signals and to said delayed segment signals for detecting the separation and the union of said lines.
(*d*) and means controlled by said detecting means for producing a code representation of said character.

5. Apparatus for recognizing characters each one formed of a number of groups of lines, comprising in combination:
(*a*) means for scanning said character;
(*b*) means controlled by said scanning means for simultaneously and separately following all the said groups of lines;
(*c*) further means controlled by said scanning means for detecting the presence of predetermined shape elements within each group of lines;
(*d*) means controlled by said scanning means for indicating for each detected shape element the group of lines to which said shape element belongs;
(*e*) a register comprising for each shape element of each one of said groups of lines a plurality of storage positions;
(*f*) and means jointly controlled by said detecting means and said indicating means for storing in said register for each one of said groups of lines an indication of the detected shape elements in different storage positions of the corresponding plurality of storage positions according to the order of occurrence of said shape elements within the corresponding group of lines.

References Cited by the Examiner

UNITED STATES PATENTS

| | | | |
|---|---|---|---|
| 2,889,535 | 6/59 | Rochester et al. ------ | 340—146.3 |
| 3,072,886 | 1/63 | Greanias et al. ------ | 340—146.3 |

MALCOLM A. MORRISON, *Primary Examiner.*